US008627278B2

(12) United States Patent
Torgerson

(10) Patent No.: US 8,627,278 B2
(45) Date of Patent: Jan. 7, 2014

(54) FREEHAND SYSTEM AND METHOD FOR CREATING, EDITING, AND MANIPULATING BLOCK DIAGRAMS

(75) Inventor: Jay Ryan Torgerson, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 1413 days.

(21) Appl. No.: 11/825,611

(22) Filed: Jul. 6, 2007

(65) Prior Publication Data
US 2007/0260332 A1 Nov. 8, 2007

Related U.S. Application Data

(63) Continuation of application No. 10/863,378, filed on Jun. 7, 2004.

(51) Int. Cl.
*G06F 9/44* (2006.01)
(52) U.S. Cl.
USPC ............. 717/113; 700/18; 345/441; 382/159; 382/185; 717/100; 717/105
(58) Field of Classification Search
USPC ................ 700/18; 345/441; 382/159, 185; 717/113, 100, 105
See application file for complete search history.

(56) References Cited

U.S. PATENT DOCUMENTS

| | | | |
|---|---|---|---|
| 5,742,280 A | 4/1998 | Ohyama | |
| 5,748,769 A | 5/1998 | Nishimura et al. | |
| 5,926,566 A | 7/1999 | Wang et al. | |
| 2004/0090439 A1* | 5/2004 | Dillner | 345/440 |
| 2004/0150667 A1 | 8/2004 | Dove et al. | |
| 2006/0227140 A1 | 10/2006 | Ramani et al. | |

FOREIGN PATENT DOCUMENTS

| | | |
|---|---|---|
| EP | 1083513 A2 | 3/2001 |
| WO | WO-2005/064423 A2 | 7/2005 |

OTHER PUBLICATIONS

Hong, Jason I. et al., "Satin: A Toolkit for Informal Ink-based Applications," *CHI Letters*, vol. 2(2):63-72 (2000).
Citrin, W.V. et al., "Distributed Architectures for Pen-Based Input and Diagram Recognition," *ACM Conference on Advanced Visual Interfaces* '96, pp. 132-140 (1996).

(Continued)

*Primary Examiner* — Tejal Gami
(74) *Attorney, Agent, or Firm* — Nelson Mullins Riley & Scarborough LLP

(57) ABSTRACT

A method of integrating freehand user input into a block diagram environment is disclosed. The freehand user input is a user's approximation of a diagram component or feature of a component which is received by the block diagram environment and compared to multiple patterns stored in a storage location. The storage location holds patterns of block diagram components and block diagram component features. The freehand user input may be displayed, superimposed on a block diagram being shown to the user. Upon the freehand user input being matched to one of the patterns representing a block diagram component or feature of a component, the freehand user input is replaced on the displayed block diagram with an electronic device drawn rendering of the matched diagram feature component or feature of a component. Partial matches of the user drawn input may result in a menu of choices being presented to the user for selection.

11 Claims, 16 Drawing Sheets

(56) References Cited

OTHER PUBLICATIONS

Costagliola, Gennaro et al., "A Multi-layer Parsing Strategy for On-line Recognition of Hand-drawn Diagrams," *Proceedings of the Visual Languages and Human-Centric Computing*, pp. 103-110 (2006).

Zhao, R. et al., "An Editor for the Rapid Prototyping of EXPRESS-G Models," retrieved online at: http://citeseer.ist.psu.edu/cache/papers/cs/3230/http:zSzzSzwww.c-lab.dezSz~wolfgangzSzeug95.pdf/an-editor-for-the.pdf (1999).

Zhao, R. et al., "Incremental Recognition in Gesture-Based and Syntax-Directed Diagram Editors," *Proceedings of the Conference on Human Factors in Computing Systems*, pp. 95-100 (1993).

European Communication for Application No. 05756532.7—1245, dated Feb. 7, 2008.

Kara, Levent Burak et al., "Sim-U-Sketch: A Sketch-based Interface for Simulink," AVI '04 Proceedings of the Working Conference on Advanced Visual Interfaces, pp. 354-357 (2004).

International Search Report for Application No. PCT/US2005/019528, 3 pages, dated Dec. 15, 2005.

\* cited by examiner

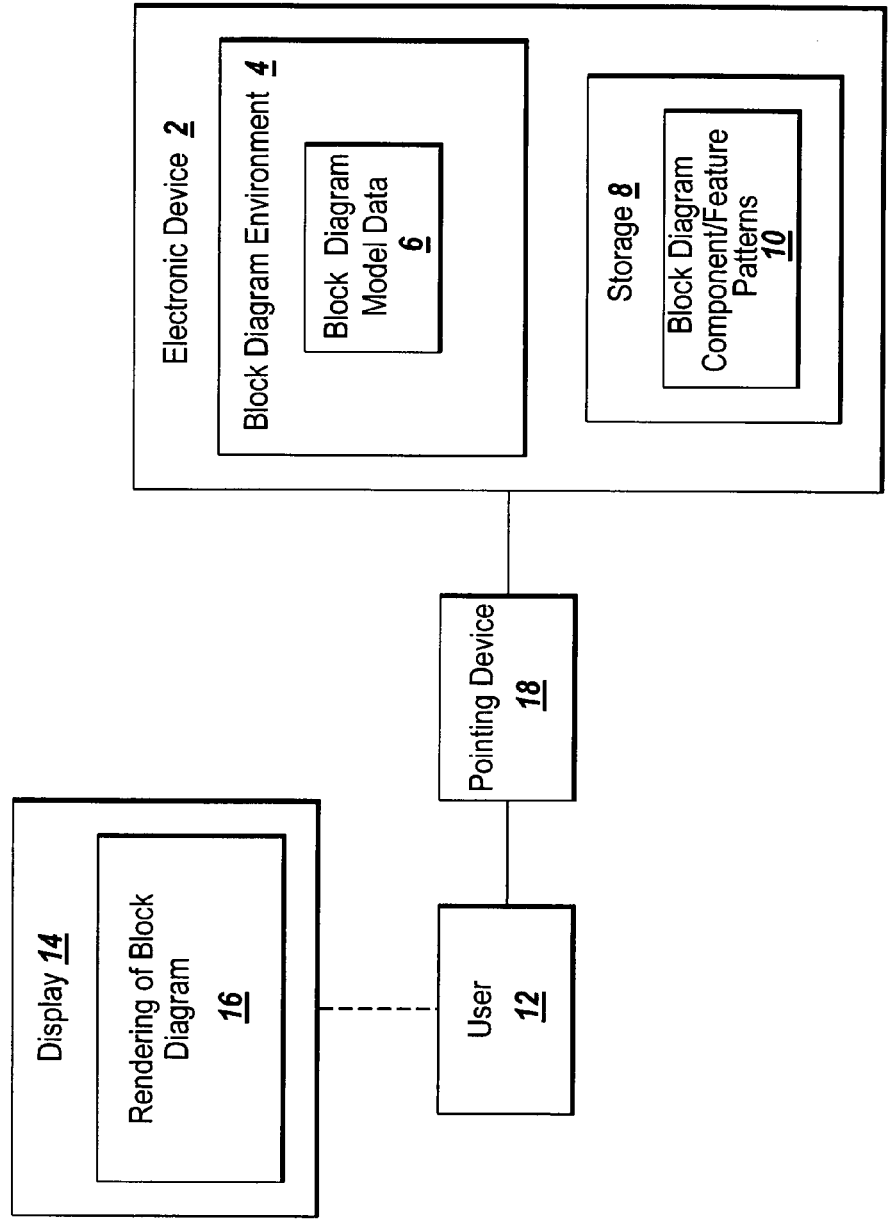

FREEHAND SYSTEM AND METHOD FOR CREATING, EDITING, AND MANIPULATING BLOCK DIAGRAMS

RELATED APPLICATION

This application is a continuation of U.S. patent application Ser. No. 10/863,378, filed Jun. 7, 2004, the entire content of which is incorporated by reference herein.

FIELD OF THE INVENTION

The illustrative embodiment of the present invention relates generally to block diagrams and more particularly to the use of freehand input data in the creation, editing and manipulation of block diagrams.

BACKGROUND

Freehand user input such as input from a mouse or optical pen operated by a user of a computer system or other electronic device is accepted by many different types of applications. For example, freehand input from a mouse is accepted by Microsoft's Paint program and enables the user to construct freehand drawings on a display surface connected to a computer system or other electronic device. One type of freehand user input is Graffiti®, a text recognition system which is used in conjunction with the Palm OS® from Palm-Source of Sunnyvale, Calif. in handheld PDAs (Personal Digital Assistants). The acceptance of the freehand input enables an application to interact with the user in an easy and well understood manner and enables the user to customize the displayed output of the particular application.

Block diagram environments such as Simulink® from The MathWorks of Natick, Mass., enable a user to construct models of dynamic systems. These models include graphical references to system components which may be used to simulate the system operations. Current block diagram environment tools enable a user to drag items from pre-defined templates into a block diagram. The components being dragged into the block diagram include attributes enabling the component to be modeled in the system during the simulation of the diagram. Unfortunately, conventional block diagram environments do not allow a user to sketch in system components using freehand input. The result is a lengthy series of drag and drop operations that the user is required to perform when constructing the block diagram. Additionally, the user must also first search to find the desired component in the proper template.

SUMMARY OF THE INVENTION

The illustrative embodiment of the present invention provides a method of integrating freehand user input into a block diagram environment. The freehand user input is a user's approximation of a diagram component or feature of a component which is received by the block diagram environment and compared to multiple patterns stored in a storage location. The storage location holds patterns of block diagram components and block diagram component features. The freehand user input may be displayed, superimposed on a block diagram being shown to the user. Upon the freehand user input being matched to one of the stored patterns representing a block diagram component or feature of a component, the freehand user input is replaced on the displayed block diagram with an electronic device drawn rendering of the matched diagram feature component or feature of a component. The component is also added to the block diagram model data. In one implementation, the user input displayed on the block diagram and the electronic device drawn rendering of the feature or component may be simultaneously displayed pending user confirmation of the selection. Partial matches of the user drawn input may result in a menu of choices being presented to the user for selection.

In one embodiment in an electronic device holding a block diagram environment with at least one block diagram, the electronic device also interfaced with a display surface displaying a block diagram, a method receives freehand user input entered with a pointing device into the block diagram. The method also compares the user input to at least one of multiple stored patterns of block diagram components and features of block diagram components. In the event of a match, the method adds the block diagram component or block diagram component feature to the block diagram model data and updates the displayed block diagram with a program-drawn block diagram component/feature representing the input data.

In another embodiment, in an electronic device interfaced with a display surface, a system includes a block diagram environment with at least one block diagram displayed on the display surface. The system also includes a pointing device interfaced with the electronic device, the pointing device being used to transmit freehand user input to the block diagram displayed on the display surface. The system additionally includes a storage location holding multiple block diagram component patterns and block diagram component feature patterns to which the freehand user input is compared. Matching block diagram components and component features from the storage location are rendered on the electronic device drawn diagram in the event of a match.

In a different embodiment in an electronic device holding a block diagram environment with at least one block diagram, the electronic device also interfaced with a display surface displaying a block diagram, a method receives freehand user input entered with a pointing device into the block diagram. The method also analyzes the user input to identify the user input as a block diagram component or block diagram component feature. In the event of an identification, the method adds the block diagram component or block diagram component feature to the block diagram model data and updates the displayed block diagram with a program-drawn block diagram component/feature representing the input data.

BRIEF DESCRIPTION OF THE DRAWINGS

FIG. 1 is a block diagram of an environment suitable for practicing the illustrative embodiment of the present invention;

DETAILED DESCRIPTION

Figure 2A:
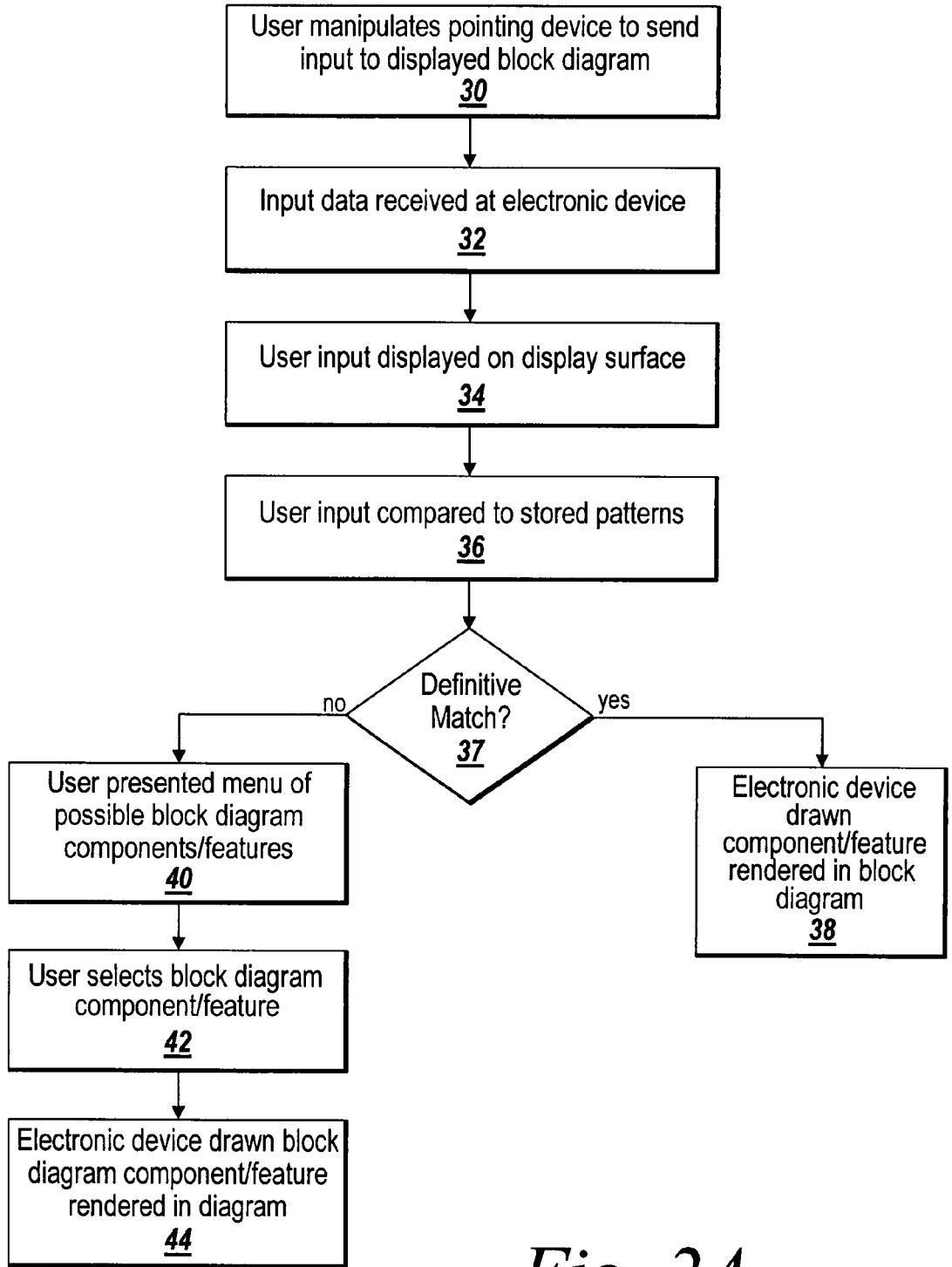
FIG. 2A is a flow chart of the sequence of steps followed by the illustrative embodiment of the present invention to compare freehand user input to stored diagram components and features.

The illustrative embodiment of the present invention allows a user to construct, modify, and manipulate block diagram elements using a pointing device. A block diagram environment displaying a block diagram receives freehand user input from a pointing device such as an optical pen or a mouse. The freehand user input is entered by patterns and gestures and is not limited to displayed elements on a template as is found in conventional drag and drop systems. The entered patterns and symbols are compared to stored patterns of block diagram components and features of components and used as the basis for electronic device drawn diagram components or component features which are added to the block diagram. By allowing freehand entry of input data in such a manner, the illustrative embodiment of the present invention greatly expands and simplifies the creation and modification of block diagram features and components.

FIG. 1 depicts an environment suitable for practicing the illustrative embodiment of the present invention. An electronic device 2 holds a block diagram environment 4. The electronic device 2 may be a personal computer, workstation, laptop, server, mainframe, PDA or some other type of electronic device equipped with a processor and able to support the block diagram environment 4. The block diagram environment 4 may be a block diagram environment such as that found in Simulink® from The MathWorks, Inc. of Natick, Mass., and Labview® from National Instruments of Austin, Tex. The block diagram environment 4 includes a least one set of block diagram model data 6 for a block diagram. The block diagram model data 6 may be a block diagram model of a system. Also included on the electronic device 2 is a storage location 8. The storage location 8 includes a stored collection of block diagram components and block diagram component feature patterns 10. Those skilled in the art will recognize that storage location 8 may also be located at other locations accessible to the block diagram environment 4. For example, the storage location 8 may be located on a remote server in a distributed environment. A user 12 manipulates a pointing device 18 which is interfaced with the electronic device 2. The pointing device 12 may be a mouse, trackball, joystick, mousepad, and light pen. A display 14 holds a rendering of block diagram 16. Input received by the block diagram environment 4 from the user manipulating the pointing device 18 is compared to the block diagram component/feature patterns 10 which are used to render a electronic device drawn version of the user input on the display 14.

FIG. 2A depicts the sequence of steps followed by the illustrative embodiment of the present invention to match freehand user input to stored block diagram components/features of components. The sequence begins when the user manipulates the pointing device 18 to send input to the displayed block diagram 16 via the block diagram environment 4 (step 30). The technique used for the user input varies with the type of input device being utilized. For example, if a mouse is being used, the user may drag a cursor around the displayed block diagram 16 in the outline of the shape of the component/feature of a component that the user is attempting to add to the block diagram 16. Similarly, if an optical pointing device is being used, the user may gesture at the diagram in the shape of the component/feature of a component. The input data is received at the electronic device 2 (step 32) and a graphical representation of the input is displayed in the rendering of the block diagram 16 (step 34). For example, a user may draw a shape in the displayed block diagram using a mouse connected to the electronic device 2. The user 12 may position the mouse cursor at the appropriate spot in the display 14. By depressing a mouse button and moving the mouse, a line is rendered in the displayed block diagram by the block diagram environment 4. The rendering is the result of the block diagram environment 4 intercepting and handling the mouse messages generated by the depression of the button on the mouse. The handling of mouse messages is well-known to those with experience in the Windows® programming environment (e.g.: WM_RBUTTONDOWN, WM_LBUTTONDOWN). The message handler cross references the coordinates associated with the intercepted message with the coordinates of the model data being displayed on the display in order to orient the input data with the block diagram data.

The shape of the user input as captured is then compared to stored patterns of block diagram components and features of block diagram components (step 36). The comparison may be made when the input data ceases, for example, through a WM_LBUTTONUP message or the failure to extend a line being rendered in response to the movements of an optical pen. Alternatively, the illustrative embodiment of the present invention may attempt comparisons based on a time parameter. A determination is made for each comparison as to whether a definitive match has been determined (step 37). The determination as to what percentage of the user input must correspond to the stored pattern to constitute a definitive match in the illustrative embodiment is an implementation choice. The illustrative embodiment of the present invention checks for points of correspondence between the user input and the stored diagram component/feature patterns 10. For some shapes, the borders of enclosed input shapes may be compared to the stored diagram component/feature patterns 10. For other shapes, both the borders, interior and/or exterior shapes may be checked for correspondence. The size of the input shapes may be normalized against the stored features/patterns with a percentage of deviation being allowed from the stored component/feature size. The stored diagram components/feature patterns 10 may be stored in a database including a size attribute associated with the component/ feature. The comparison may only compare the entered pattern to stored components/features within the deviation range. Distances and angles of the input data are compared to the stored/components features accounting for pre-defined amount of size deviation.

Figure 2B:
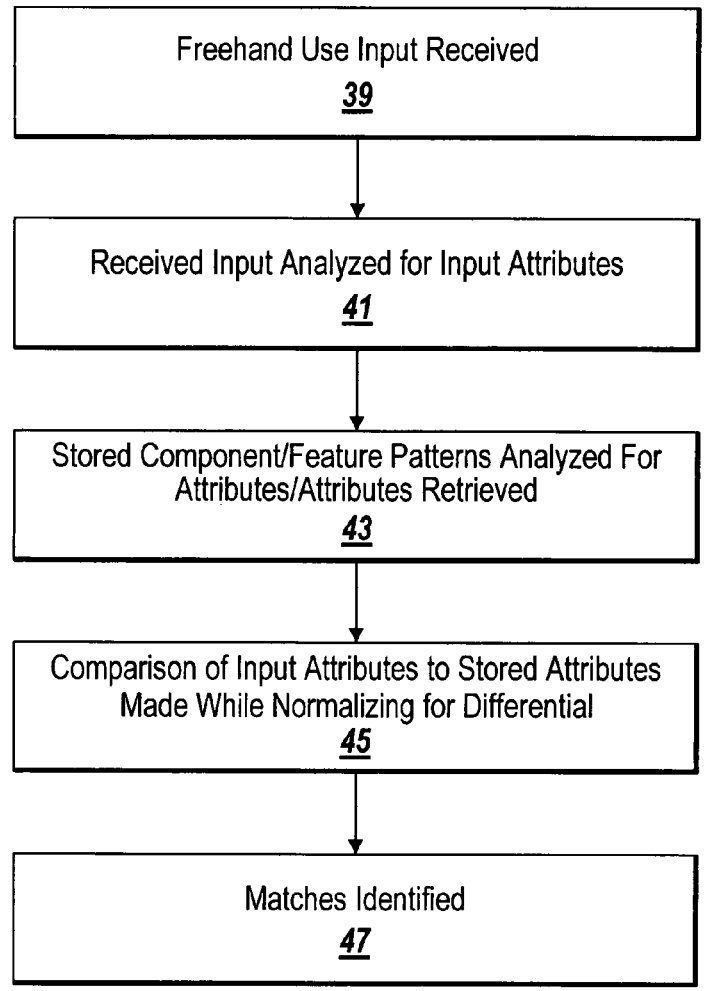
FIG. 2B is a flowchart examining the comparison and normalization process in greater detail.

The process of determining a definitive match while normalizing for the size differential between the input data and the stored patterns is illustrated in greater detail in the flowchart of FIG. 2B. After receiving the freehand user input (step 39), the illustrative embodiment of the present invention analyzes the received input to identify attributes of the input data (e.g.: length of line, direction of line, angle between lines, etc.) (step 41). The stored components/features of components are retrieved and similarly analyzed (step 43). Alternatively, the stored patterns may have already been analyzed in which case the attributes for the stored patterns are retrieved. The input attributes are then compared to the stored attribute patterns while normalizing for size differential (step 45). The normalization process is necessary since in most cases the user's freehand input will not be to exactly the same scale as the stored patterns. Any matches from the comparison are identified (step 47).

In the event of a definitive match, an electronic device drawn component or feature of a component corresponding to the user input data is rendered in the block diagram 16 (step 38). Alternatively, if there is not a definitive match, but rather several possibilities, the user may be presented with a menu of possible block diagram components or features of components which may correspond to component/feature the user was attempting to add to the block diagram (step 40). Following a user selection of the appropriate component or feature (step 42) the electronic device adds the input data to the block diagram model data and draws the component or feature of the component in the rendering of the block diagram 16 (step 44).

Figure 3A:
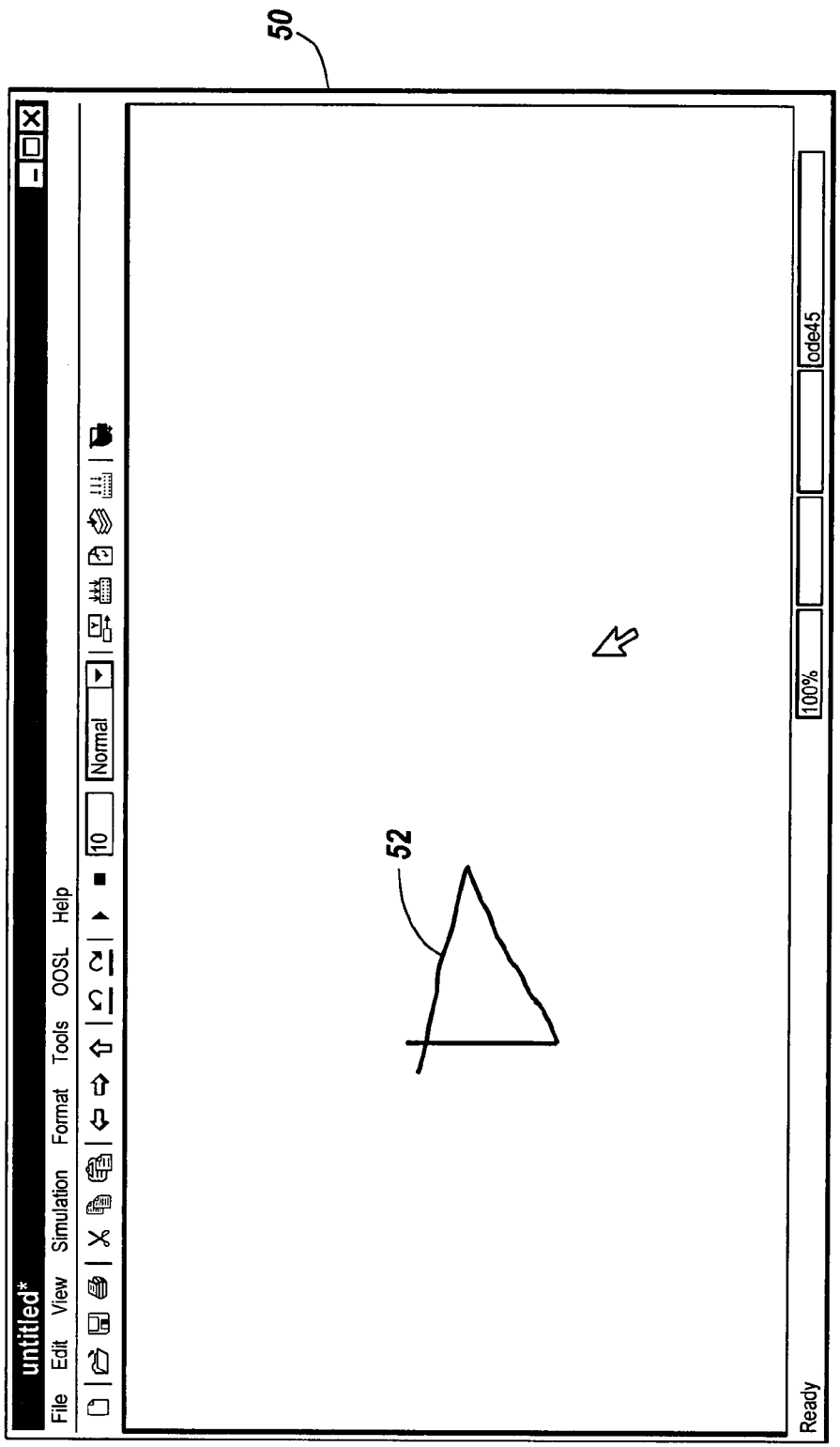
FIG. 3A is a view of the illustrative embodiment of the present invention showing received freehand user input displayed in a block diagram environment.
Figure 3B:
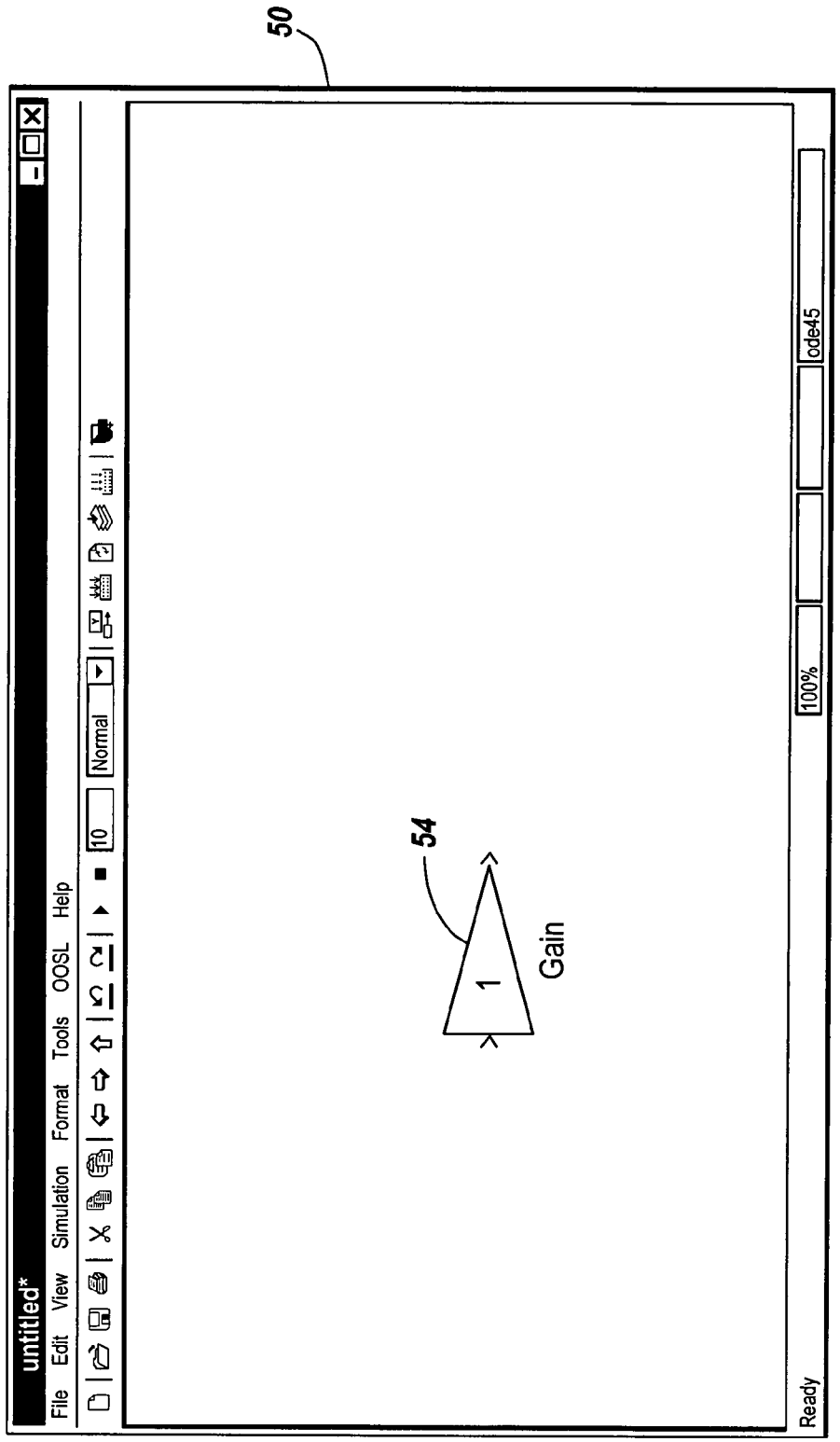
FIG. 3B is a view of the illustrative embodiment of the present invention showing a electronic device drawn diagram component based on the freehand user input.

The visual effect of the matching of freehand user input to the stored patterns is depicted in FIGS. 3A and 3B. FIG. 3A depicts a view 50 of a block diagram environment in the illustrative embodiment of the present invention in which a user has entered freehand input 52 representing a triangular shape. The illustrative embodiment of the present invention matches the freehand user input to a stored pattern in the collection of patterns of block diagram components and component features. The block diagram environment 4 generates the view 50 of FIG. 3B showing an electronic device rendered gain block 54.

Figure 4A:
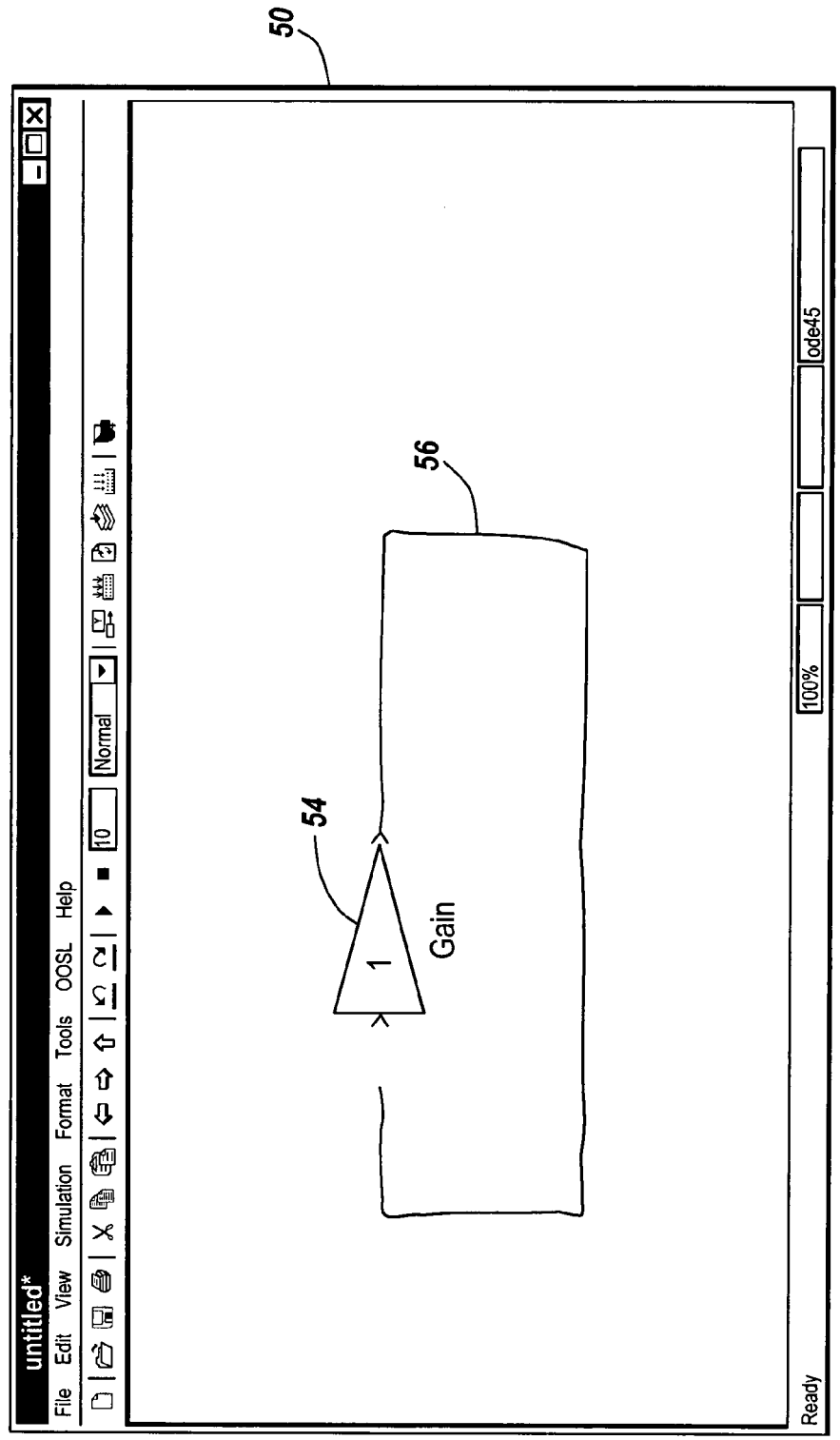
FIG. 4A is a view of the illustrative embodiment of the present invention showing freehand user input being appended to a previously drawn electronic device generated diagram component.
Figure 4B:
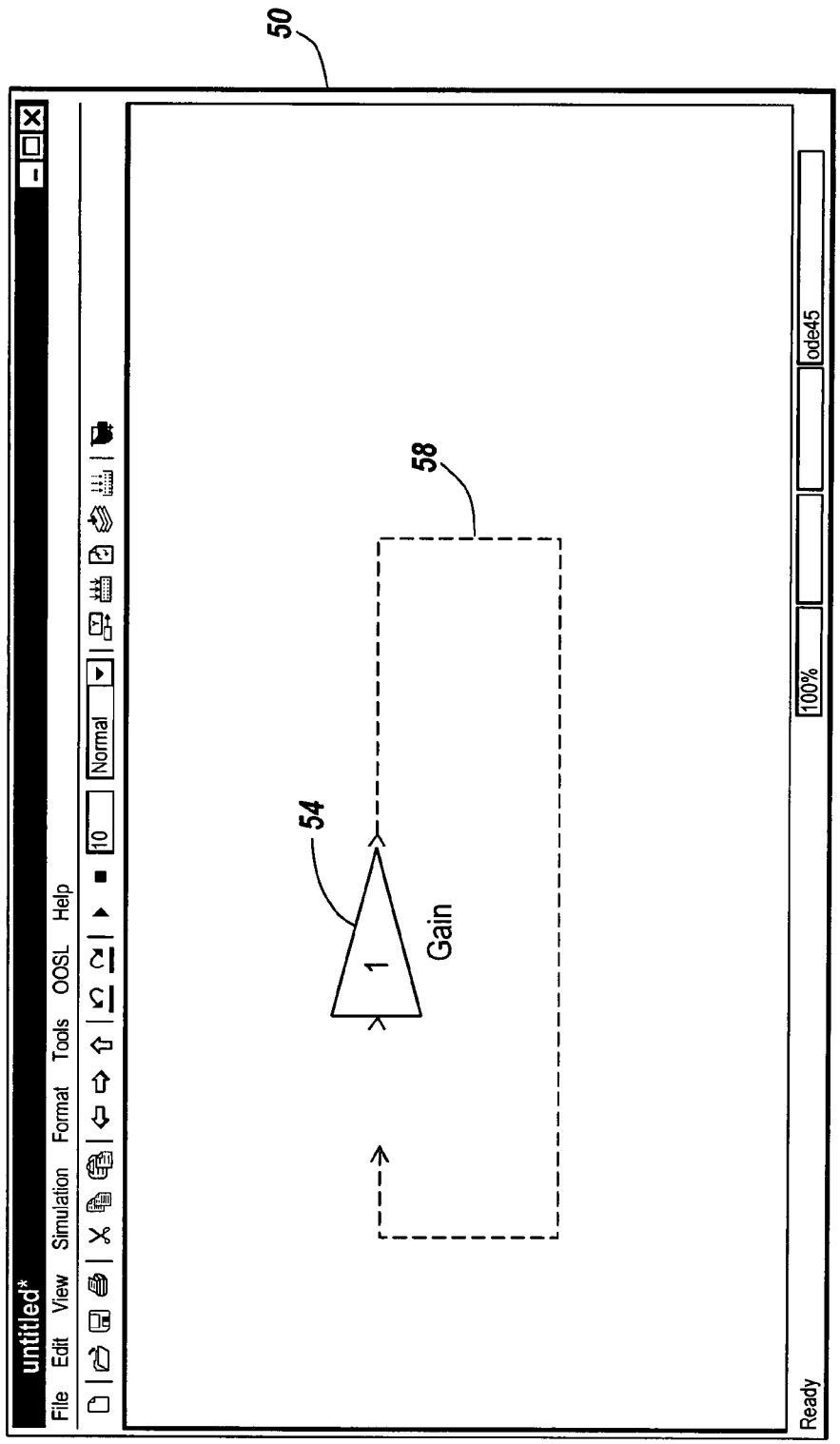
FIG. 4B is a view of the illustrative embodiment of the present invention showing a electronic device drawn replacement of the freehand user input FIG. 4A.

The illustrative embodiment of the present invention may also be used to add additional components to an already existing block diagram as depicted in FIGS. 4A and FIG. 4B. FIG. 4A depicts the view 50 and computer generated gain block 54 of FIGS. 3A and 3B to which freehand user input of a rough approximation of a feedback signal 56 has been added to the electronic device drawn components previously appearing on the display. As before, the freehand user input for the feedback signal approximation 56 is compared to the diagram component and feature patterns 10 that are stored at a location 8 accessible to the block diagram environment 4. In FIG. 4B a computer rendered feedback signal 58 is then generated to replace the user drawn input 56. Depending upon the implementation, the electronic device drawn feedback signal may be superimposed over the user freehand input signal 56 until such time as the user indicates a confirmation of the substituted element. Those skilled in the art will recognize that such confirmation may be given in a number of different manners such as by clicking on the electronic device drawn component or component feature or clicking a control button in a popup dialog box which requests verification.

Figure 5A:
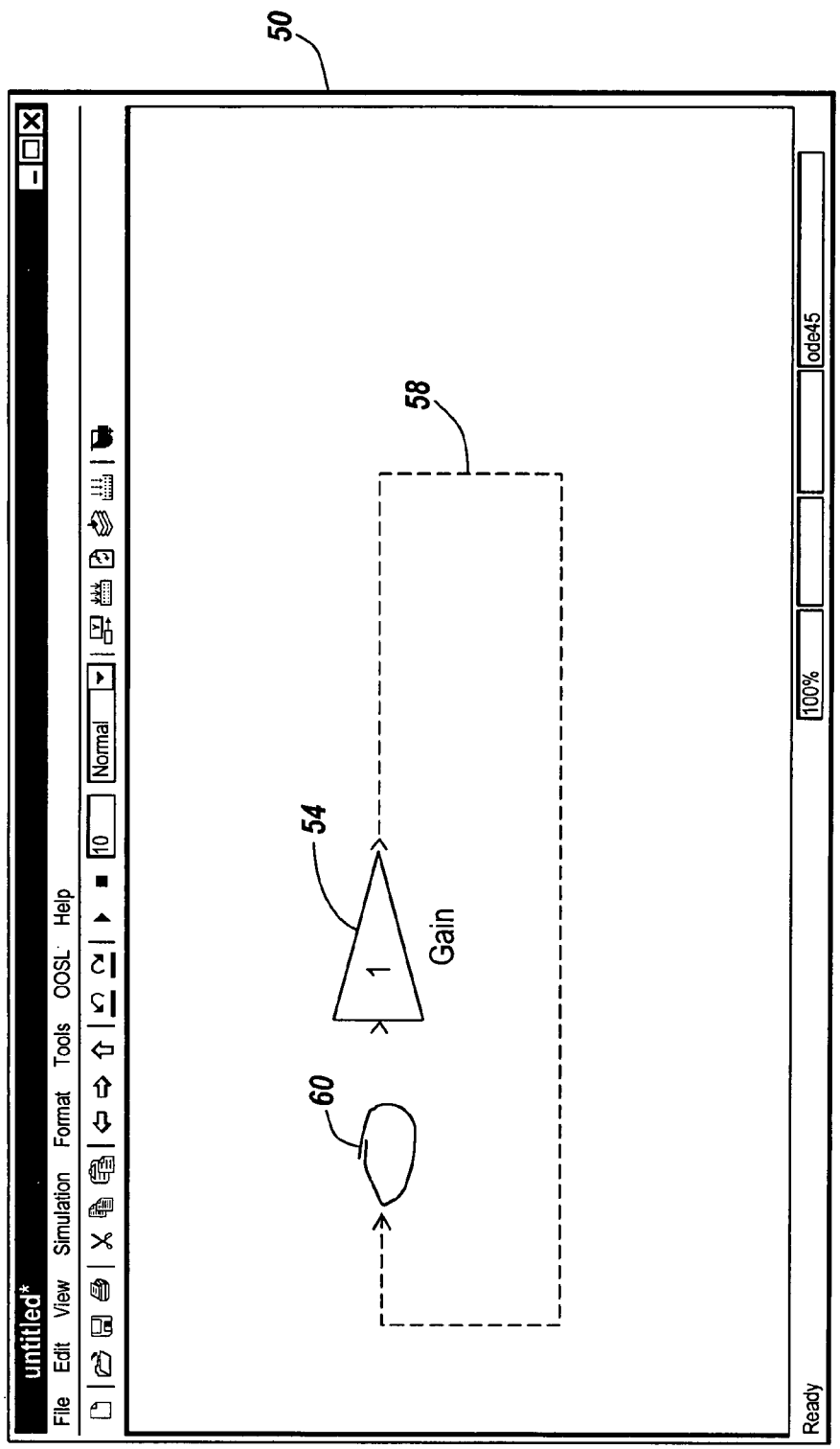
FIG. 5A is a view of the illustrative embodiment of the present invention showing an initial display of the received freehand user input appended to a feedback loop in a block diagram.
Figure 5B:
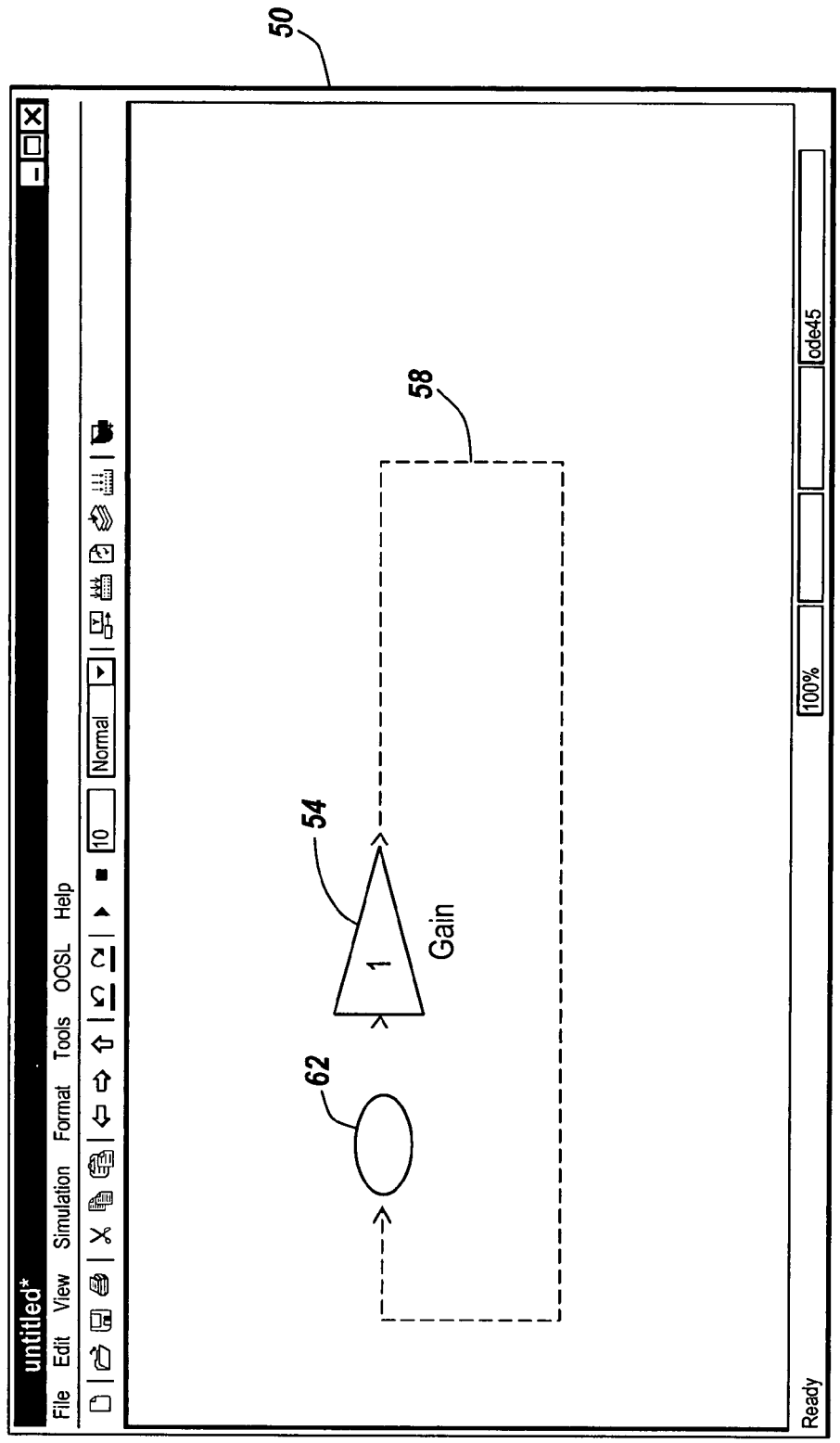
FIG. 5B shows an electronic device rendering of the partial component depicted in the freehand user input of FIG. 5A.
Figure 5C:
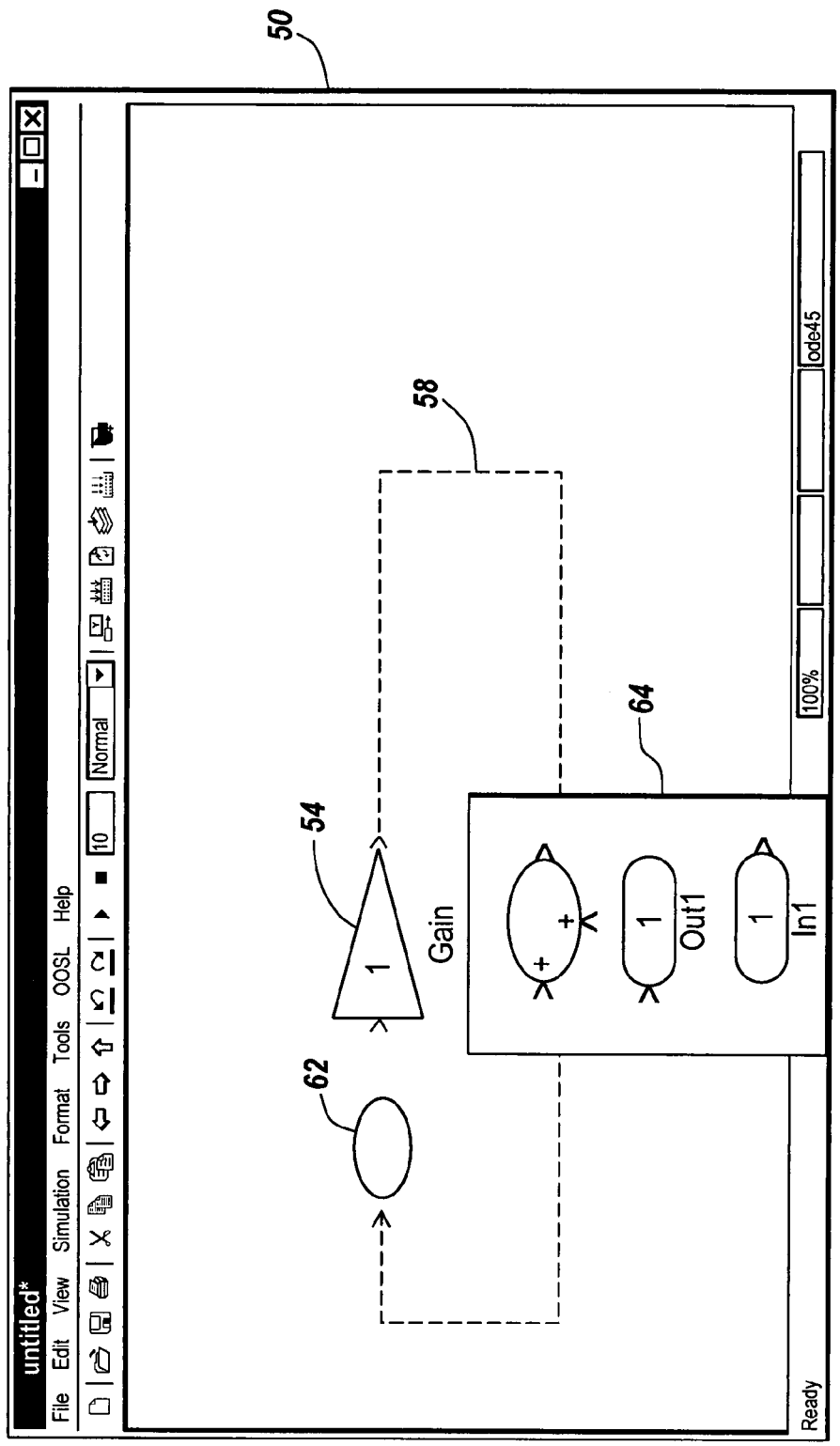
FIG. 5C is a view of the illustrative embodiment of the present invention showing a displayed menu of choices of finished components possibly completing the previously drawn component of FIG. 5A and FIG. 5B.
Figure 5D:
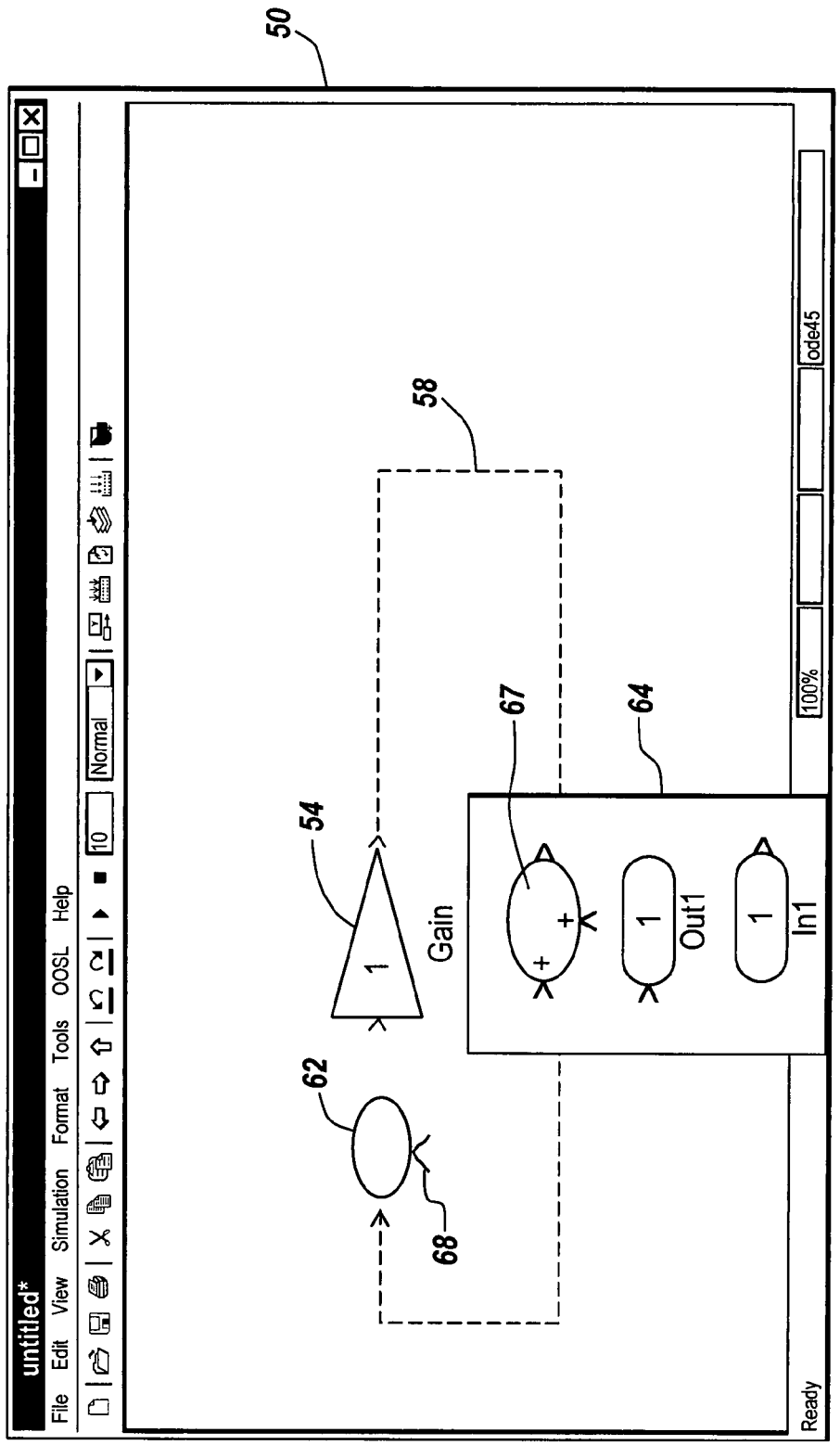
FIG. 5D is a view of the illustrative embodiment of the present invention showing the view of FIG. 5C wherein the user has selected one of the possibilities displayed in the menu by entering additional freehand input corresponding to a menu choice.
Figure 5E:
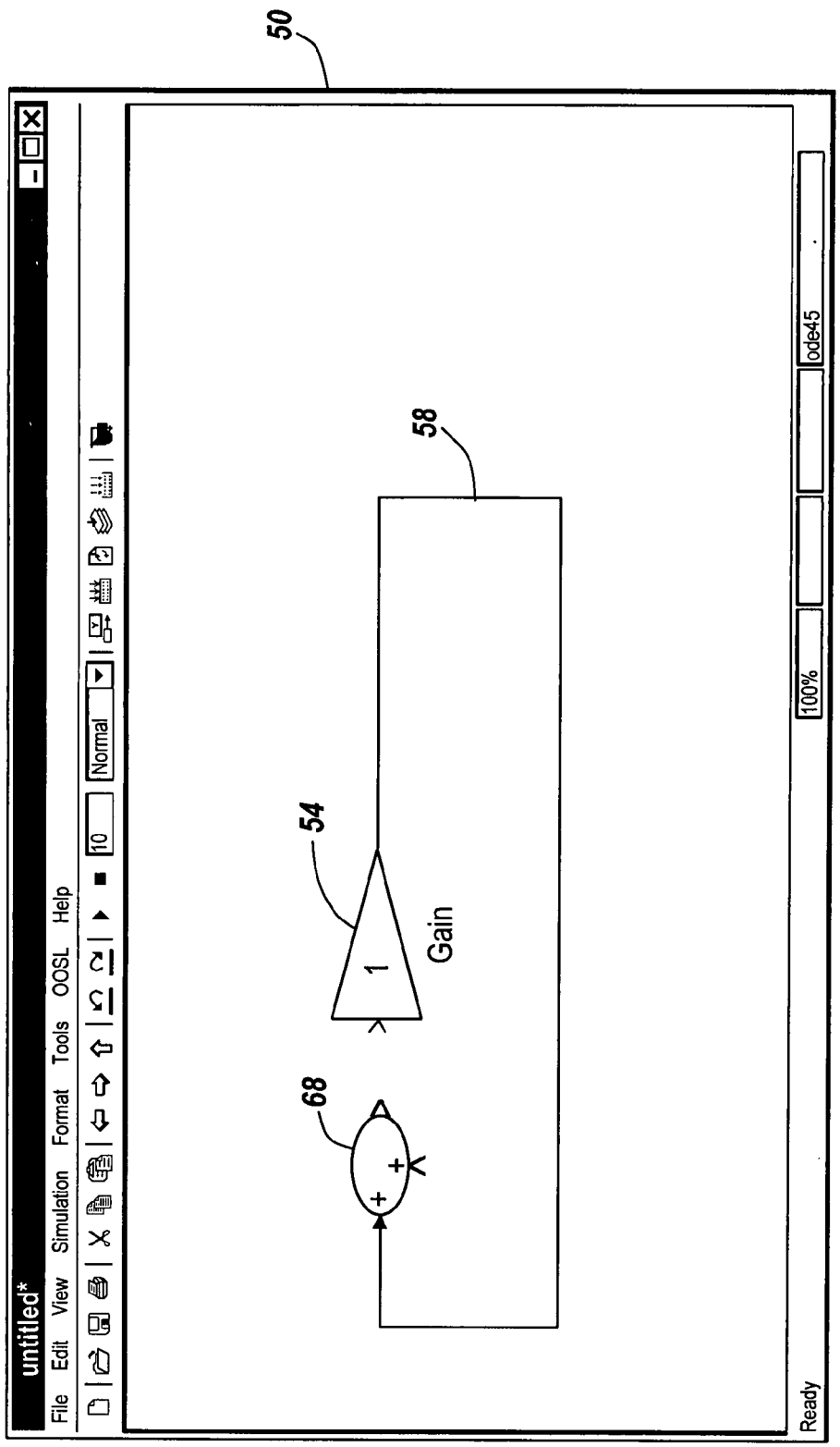
FIG. 5E shows the final electronic device drawn rendering of the additional component of FIG. 5D.

The sequence of views generated by the illustrative embodiment of the present invention to choose a component from among many components is illustrated in FIGS. 5A through 5E. FIG. 5A shows a view 50 with the electronic device generated gain block 54 and feedback signal 58 as well as additional user freehand input 60 of a circular shape near the end of the feedback signal. FIG. 5B shows the view 50 including the components previously discussed in FIG. 5A with the user input 60 replaced by an electronic device generated circle 62. The electronic device generated circle 62 represents a partially completed block diagram component. FIG. 5C depicts the view 50 with the gain block 54, feedback signal 58 and circle 62 as well as additional choices displayed on a menu 64. The menu 64 displays a list of potential matches for the partially completed element 62. FIG. 5D depicts the previous view 50 as well as an additional freehand feature 66 added by the user to the previously displayed computer rendered circle 62. The additional freehand feature 66 matches one of the components 67 displayed in the menu 64. FIG. 5E shows the electronic device generated replacement of the user drawn feature 66. The result is a sum block 68 added on to the end of the feedback signal 58.

Figure 6A:
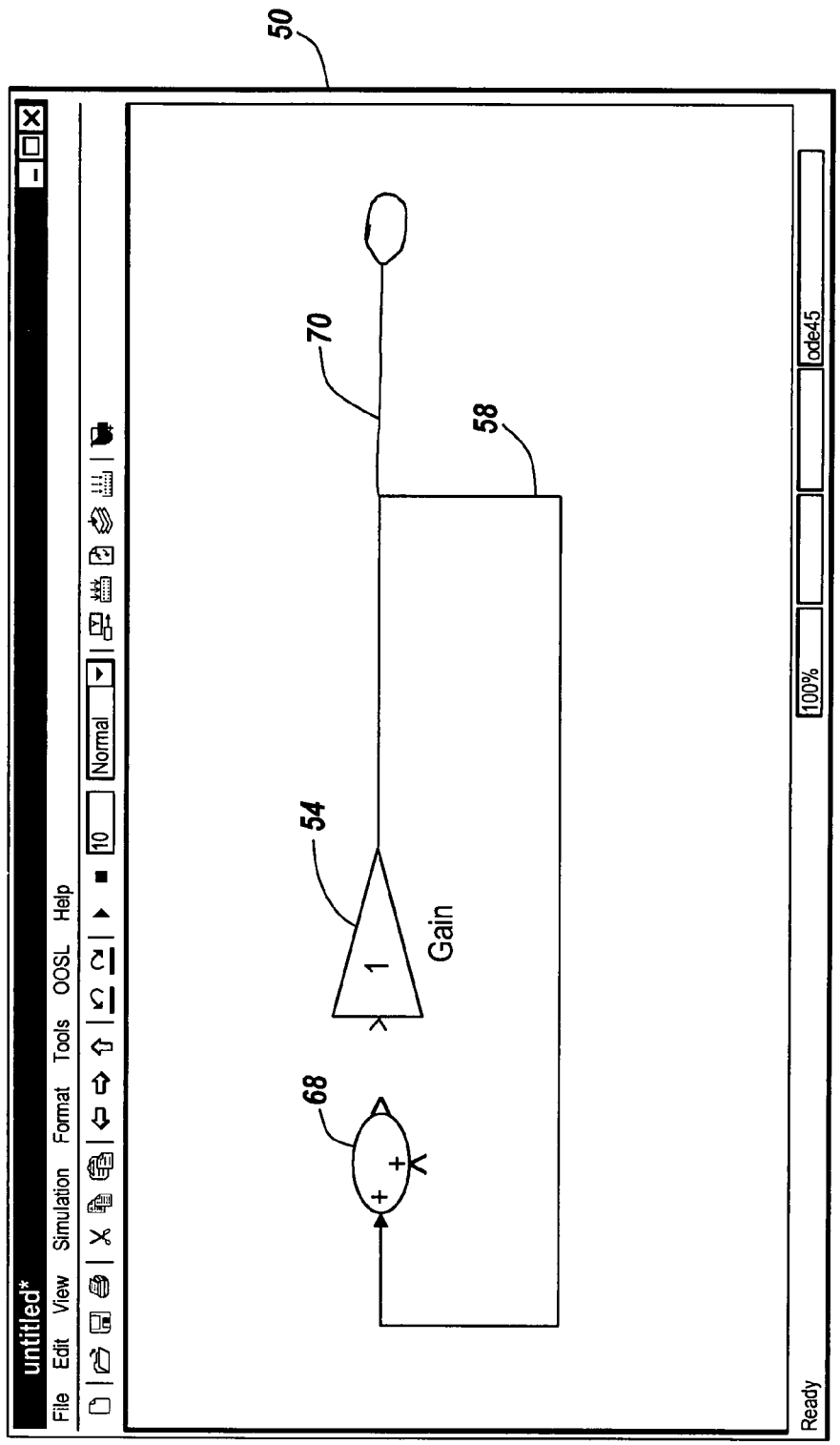
FIG. 6A shows a user drawn output being added to the diagram of FIG. 5E.
Figure 6B:
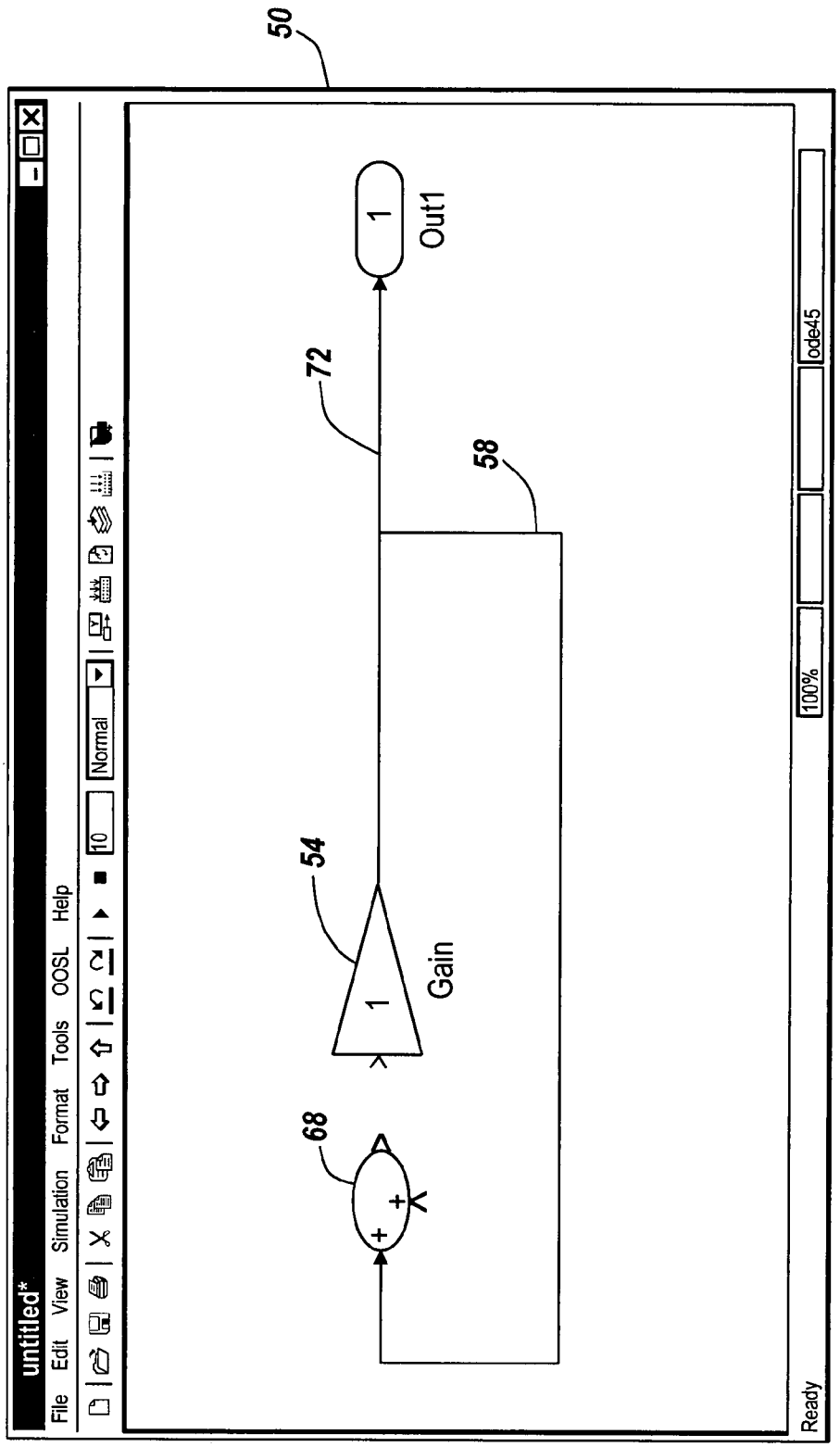
FIG. 6B shows a electronic device drawn replacement for the user input displayed in FIG. 6A.

A user may also add additional components to previously stored diagrams using the illustrative embodiment of the present invention. For example, FIG. 6A depicts view 50 including the gain block 54, feedback signal 58, and sum block 68 to which the user indicates a desire to add an output port through the creation of a freehand user input. Those skilled in the art will recognize that the previously stored block diagram may be retrieved from any location accessible to the block diagram environment 4. FIG. 6B shows the result after matching the freehand user input to a stored pattern, the generation of a computer rendered output port 72.

Those skilled in the art will recognize that alternate forms of analysis rather than an explicit comparison may also be used by the illustrative embodiment of the present invention to identify the freehand user input. For example, a neural net may be used to determine the type of block diagram component/feature the user is attempting to add via freehand user input. The neural net may attempt to analyze small pieces of user input in parallel to identify the desired component/feature the user is attempting to add to the block diagram.

Figure 7A:
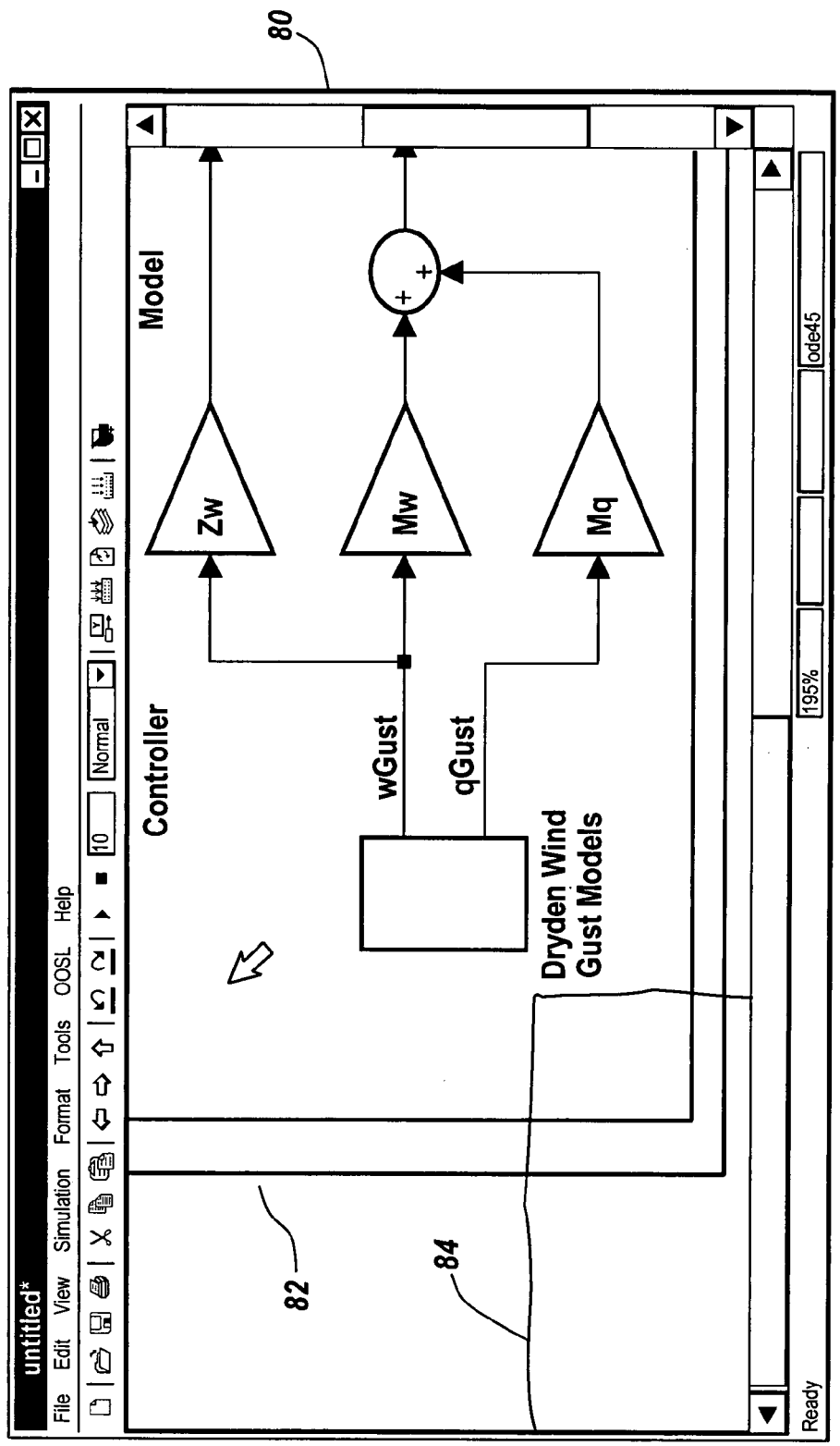
FIG. 7A shows freehand user input indicating a request for an additional view of the diagram being displayed.
Figure 7B:
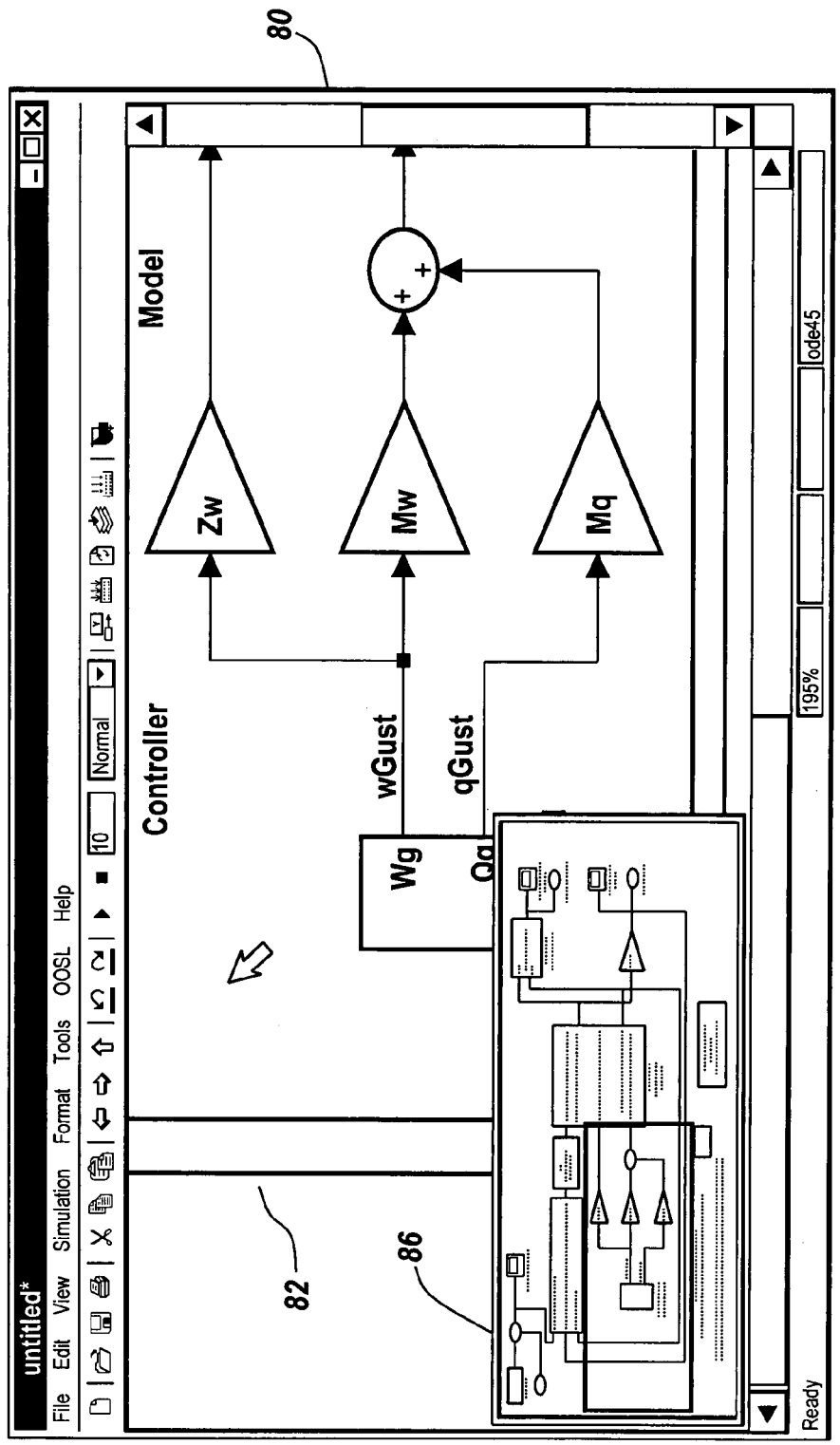
FIG. 7B shows a zoomed-out viewer superimposed on a portion of the block diagram in response to the received freehand user input displayed in FIG. 7A.

The illustrative embodiment of the present invention may also be used to call up block diagram tools through the use of freehand gestures. FIG. 7A depicts a view 80 of a portion of a block diagram 82. A user sketch enclosing the lower left hand corner of the displayed view 80 creates a rough box 84. The gesture is evaluated by comparing it to stored patterns and results in the calling of a zoomed-out viewer showing the entire block diagram or subsystem 86 (of which the main view 80 is only displaying a portion) superimposed in the lower left corner of the view as illustrated in FIG. 7B.

Similar to the procedure used to call up block diagram tools, a pre-defined input may also be used to cause the deletion of a component. For example, an "x" written over a diagram component may be interpreted as a delete signal. Similarly, pre-defined input such as a symbol may result in the insertion of a complete block or subsystem into the block diagram.

In one aspect of the illustrative embodiment of the present invention, a user may switch between an editing mode and an interpreted mode in the block diagram environment 4. The editing mode allows the user to make changes to the block diagram without the pattern comparison taking place. In the interpreted mode, once the user activates the mode, pattern comparison is performed in response to the user input. This ability to toggle the interpreted mode on and off prevents unwanted components and component features from being inadvertently added to a block diagram.

In another aspect of the illustrative embodiment of the present invention, the user may teach the block diagram environment to interpret specific freehand user input gestures. User input may be entered and the environment subsequently instructed to interpret the entered input in a certain manner and perform an associated action. For example, the user may enter a learning mode and enter freehand input. After entering the input in the learning mode, the user indicates to the block diagram environment a specific action (e.g.: perform function, add component) that is to be associated with the input. The entered pattern and its association is saved, and subsequent user entries of that pattern in interpreted mode result in the specified action being performed.

Although the examples contained herein have been discussed with reference to a block diagram environment, it should be appreciated that the present invention may also be implemented in other design environments. For example, the method of accepting and handling freehand user input that have been discussed above may be implemented in a user interface design system where various controls are added to a user interface in response to the received freehand user input. The illustrative embodiment of the present invention may also be practiced in a software diagram environment such as that found in Stateflow® from The MathWorks, Inc. of Natick, Mass. or Unified Modeling Language (UML) environments.

Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequence of steps utilized in the illustrative flowcharts are examples and not the exclusive sequence of steps possible within the scope of the present invention.

We claim:

1. In an electronic device, a method comprising:
   receiving an indication to enter a learning mode in a block diagramming environment;
   receiving, while in the learning mode, an indication of a pattern;
   receiving, while in the learning mode, an indication of a block diagram tool;
   associating the pattern with the block diagram tool so that a subsequent entry of the pattern, in an interpretive mode of the block diagramming environment, results in the block diagram tool being provided in the block diagramming environment;
   displaying a rendering of the block diagram in the block diagramming environment;
   receiving a freehand user input, the receiving:
      performed when the block diagramming environment is in the interpretive mode, and related to the block diagram tool;
   comparing the freehand user input with the pattern; and
   as a result of a matching comparison between the freehand user input and the pattern, providing the block diagram tool in the block diagramming environment.

2. The method of claim 1, wherein the freehand user input includes gesture information.

3. The method of claim 1, further comprising entering the interpretive mode based at least in part on an input to the block diagramming environment.

4. The method of claim 1, wherein comparing the freehand user input with the pattern includes normalizing the freehand user input.

5. The method of claim 1, wherein comparing the freehand user input with the pattern includes normalizing the pattern.

6. The method of claim 1, wherein the tool includes a viewer.

7. A system comprising:
   a processing element for:
      receiving an indication to enter a learning mode in a block diagramming environment, receiving, while in the learning mode, an indication of a pattern, receiving, while in the learning mode, an indication of an action, the action relating to a block diagram tool, associating the pattern with the action so that a subsequent entry of the pattern, in an interpretive mode in the block diagramming environment, results in the block diagram tool being provided in the block diagramming environment, receiving a freehand user input while in the interpretive mode, comparing the freehand user input with the pattern, and providing the block diagram tool in the block diagramming environment based on a result of the comparing.

8. The system of claim 7, wherein the block diagram tool includes a viewer.

9. The system of claim 7, wherein, comparing the freehand user input with the pattern includes normalizing the freehand user input.

10. A non-transitory medium holding computer-executable instructions, the instructions including one or more instructions for:
    receiving an indication to enter a learning mode in a block diagramming environment;
    receiving, while in the learning mode, an indication of a pattern;
    receiving, while in the learning mode, an indication of a block diagram tool;
    associating the pattern with the block diagram tool so that a subsequent entry of the pattern, in an interpretive mode of the block diagramming environment, results in the block diagram tool being provided in the block diagramming environment;
    displaying a rendering of the block diagram in the block diagramming environment;
    receiving a freehand user input, the receiving:
       performed when the block diagramming environment is in the interpretive mode, and related to the block diagram tool;
    comparing the freehand user input with the pattern; and
    as a result of a matching comparison between the freehand user input and the pattern, providing the block diagram tool in the block diagramming environment.

11. The non-transitory medium of claim 10, wherein the block diagram tool includes a viewer.

* * * * *